US011533358B1

(12) United States Patent
Khare et al.

(10) Patent No.: US 11,533,358 B1
(45) Date of Patent: Dec. 20, 2022

(54) ROAMING HUB FOR SECURE INTERCONNECT IN ROAMING SCENARIOS

(71) Applicant: Nokia Technologies Oy, Espoo (FI)

(72) Inventors: Saurabh Khare, Bangalore (IN);
Bruno Landais, Pleumeur-Bodou (FR);
Anja Jerichow, Grafing bei Munchen (DE); Laurent Thiebaut, Antony (FR);
Georgios Gkellas, Petroupoli Atiikis (GR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/477,735

(22) Filed: Sep. 17, 2021

(51) Int. Cl.
*H04L 67/02* (2022.01)
*H04L 69/22* (2022.01)
*H04L 69/329* (2022.01)

(52) U.S. Cl.
CPC .............. *H04L 67/02* (2013.01); *H04L 69/22* (2013.01); *H04L 69/329* (2013.01)

(58) Field of Classification Search
None
See application file for complete search history.

(56) References Cited

U.S. PATENT DOCUMENTS

| 8,774,796 B2 * | 7/2014 | Aoki | H04W 64/00 455/433 |
| 2021/0014680 A1 * | 1/2021 | Saarinen | H04W 12/106 |
| 2022/0104112 A1 * | 3/2022 | Rajput | H04W 12/122 |

OTHER PUBLICATIONS

3GPP TS 23.501 V173131 (Jun. 2021) System architecture for the 5G System (5GS) Stage 2 Release 17.
3GPP TS 29.501 v17.2.0 (Jun. 2021) Principles and Guidelines for Services Definition Stage 3 Release 17.
3GPP TS 29.510 v17.2.0 (Jun. 2021) Network Function Repository Services Stage 3 Release 17.
3GPP TS 29.573 v17.1.0 (Jun. 2021) 5G System; Public Land Mobile Network (PLMN) Interconnection Stage 3 Release 17.
3GPP TS 33.501 v17.2.1 (Jun. 2021) Security architecture and procedures for 5G system Release 17.

* cited by examiner

*Primary Examiner* — James A Edwards
(74) *Attorney, Agent, or Firm* — Duft & Bornsen, PC

(57) ABSTRACT

Systems, methods, and software for inter-PLMN communications. In one embodiment, a roaming hub receives a message from a sending entity across an N32 interface, and determines whether the message includes an HTTP custom header that indicates a PLMN that is validated. When the message as received does not include the HTTP custom header, the roaming hub adds the HTTP custom header to the message that indicates the PLMN of the sending entity, integrity protects the HTTP custom header, and forwards the message toward a receiving entity.

20 Claims, 11 Drawing Sheets

ROAMING HUB FOR SECURE INTERCONNECT IN ROAMING SCENARIOS

TECHNICAL FIELD

This disclosure is related to the field of communication systems and, in particular, to next generation networks.

BACKGROUND

Next generation networks, such as Fifth Generation (5G), denote the next major phase of mobile telecommunications standards beyond Fourth Generation (4G) standards. In comparison to 4G networks, next generation networks may be enhanced in terms of radio access and network architecture. Next generation networks intend to utilize new regions of the radio spectrum for Radio Access Networks (RANs), such as centimeter and millimeter wave bands.

A user of a 5G network has a home Public Land Mobile Network (HPLMN), and the user may access services when located in the coverage area of the HPLMN. When a user roams onto another PLMN (i.e., a visited PLMN or VPLMN) different than their HPLMN, the 5G Core Network (5GC) of the HPLMN is able to interconnect or interwork with the 5GC of the VPLMN so that the user can access services even when roaming outside of their HPLMN.

Security can be an issue when a user roams into a VPLMN. The Third Generation Partnership Project (3GPP) has stated that a Security Edge Protection Proxy (SEPP) be implemented for secure interconnect between PLMNs in roaming scenarios. A SEPP is an entity sitting at the perimeter of a PLMN and is configured to protect control plane messages as is further described in 3GPP TS 33.501 (v17.2.1), which is incorporated by reference as if fully included herein. In one example of a roaming scenario, a SEPP is implemented at the edge of a VPLMN, and another SEPP is implemented at the edge of the HPLMN. Control plane messages are exchanged between the SEPPs over the N32 interface.

There may be instances when one or more intermediate proxies are implemented between SEPPs of PLMNs. The use of intermediate proxies in this manner may cause issues with secure interconnect.

SUMMARY

Described herein are enhanced mechanisms for secure interconnect. In the embodiments described herein, a roaming hub is a type of intermediate proxy implemented in a signaling path between a SEPP of one PLMN and a SEPP of another PLMN. When receiving a message over the signaling path from a sending entity, the roaming hub is configured to add a custom header or custom headers to the message as defined herein, and/or modify the custom headers if already present. In one example, the roaming hub is configured to add a custom header that indicates a PLMN of the sending entity that is validated by the roaming hub. In another example, the roaming hub is configured to add a custom header that indicates an identifier for the roaming hub. The information contained in the custom header(s) may be used at a responding SEPP or another entity for validation, charging, troubleshooting, etc., which is described in more detail below.

One embodiment comprises a method of message forwarding. The method comprises receiving, at a roaming hub, a message from a sending entity across an N32 interface, and determining, at the roaming hub, whether the message includes a first Hypertext Transfer Protocol (HTTP) custom header that indicates a PLMN that is validated. When the message as received does not include the first HTTP custom header, the method further comprises adding the first HTTP custom header to the message that indicates the PLMN of the sending entity, integrity protecting the first HTTP custom header, and forwarding the message from the roaming hub toward a receiving entity.

In one embodiment, when the message as received includes the first HTTP custom header, the method further comprises performing integrity verification on the first HTTP custom header to validate content of the first HTTP custom header, integrity protecting the first HTTP custom header, and forwarding the message from the roaming hub toward the receiving entity.

In one embodiment, the first HTTP custom header is defined to indicate a PLMN identifier of a service consumer of the message that is validated.

In one embodiment, the method further comprises receiving the message from the roaming hub at a SEPP across the N32 interface, and determining at the SEPP whether the message includes the first HTTP custom header. When the message received at the SEPP includes the first HTTP custom header, the method further comprises validating a PLMN of a service consumer based at least on a token contained in an HTTP standard header of the message and a PLMN identifier contained in the first HTTP custom header.

In one embodiment, the method further comprises determining, at the roaming hub, whether the message includes a second HTTP custom header that indicates one or more roaming hubs that relayed the message. When the message as received does not include the second HTTP custom header, the method further comprises adding the second HTTP custom header to the message that indicates a roaming hub identifier of the roaming hub, and integrity protecting the second HTTP custom header.

In one embodiment, when the message as received includes the second HTTP custom header, the method further comprises performing integrity verification on the second HTTP custom header to validate content of the second HTTP custom header, adding the roaming hub identifier to an instance of the second HTTP custom header, and integrity protecting the second HTTP custom header or second HTTP custom headers.

In one embodiment, the second HTTP custom header is defined to indicate a list of roaming hub identifiers. Adding the roaming hub identifier to an instance of the second HTTP custom header comprises modifying a present instance of the second HTTP custom header as received in the message to indicate the roaming hub identifier in the list.

In one embodiment, the second HTTP custom header is defined to indicate an identifier of a single roaming hub. Adding the roaming hub identifier to an instance of the second HTTP custom header comprises adding another instance of the second HTTP custom header to the message that indicates the roaming hub identifier.

In one embodiment, the method further comprises receiving the message from the roaming hub at a SEPP across the N32 interface, and determining whether the message includes one or more instances of the second HTTP custom header. When the message received at the SEPP includes the second HTTP custom header, the method further comprises forwarding one or more roaming hub identifiers contained in the second HTTP custom header or the second HTTP custom headers to another entity.

In one embodiment, forwarding one or more roaming hub identifiers contained in the second HTTP custom header or the second HTTP custom headers comprises at least one of forwarding the one or more roaming hub identifiers to a charging function, and forwarding the one or more roaming hub identifiers to a tracing function.

In one embodiment, integrity protecting the first HTTP custom header and integrity protecting the second HTTP custom header comprises signing the first HTTP custom header and the second HTTP custom header with an indication of the roaming hub.

In one embodiment, the second HTTP custom header indicates at least one of a PLMN identifier for the roaming hub, a Fully Qualified Domain Name (FQDN) identifier for the roaming hub, an Internet Protocol (IP) address for the roaming hub, and an instance identifier for the roaming hub.

Another embodiment comprises an apparatus, such as a roaming hub, comprising at least one memory including computer program code. The memory and the computer program code are configured to, with the at least one processor, cause the apparatus at least to receive a message from a sending entity across an N32 interface, and determine whether the message includes a first HTTP custom header that indicates a PLMN that is validated. When the message as received does not include the first HTTP custom header, the computer program code and the processor cause the apparatus to add the first HTTP custom header to the message that indicates the PLMN of the sending entity, integrity protect the first HTTP custom header, and forward the message toward a receiving entity.

In one embodiment, when the message as received includes the first HTTP custom header, the computer program code and the processor cause the apparatus to perform integrity verification on the first HTTP custom header to validate content of the first HTTP custom header, integrity protect the first HTTP custom header, and forward the message toward the receiving entity.

In one embodiment, the computer program code and the processor cause the apparatus to determine whether the message includes a second HTTP custom header that indicates one or more roaming hubs that relayed the message. When the message as received does not include the second HTTP custom header, the computer program code and the processor cause the apparatus to add the second HTTP custom header to the message that indicates a roaming hub identifier of the apparatus, and integrity protect the second HTTP custom header.

In one embodiment, when the message as received includes the second HTTP custom header, the computer program code and the processor cause the apparatus to perform integrity verification on the second HTTP custom header to validate content of the second HTTP custom header, add the roaming hub identifier to an instance of the second HTTP custom header, and integrity protect the second HTTP custom header or second HTTP custom headers.

In one embodiment, the second HTTP custom header is defined to indicate a list of roaming hub identifiers. To add the roaming hub identifier to an instance of the second HTTP custom header, the computer program code and the processor cause the apparatus to modify a present instance of the second HTTP custom header as received in the message to indicate the roaming hub identifier in the list.

In one embodiment, the second HTTP custom header is defined to indicate an identifier of a single roaming hub. To add the roaming hub identifier to an instance of the second HTTP custom header, the computer program code and the processor cause the apparatus to add another instance of the second HTTP custom header to the message that indicates the roaming hub identifier.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
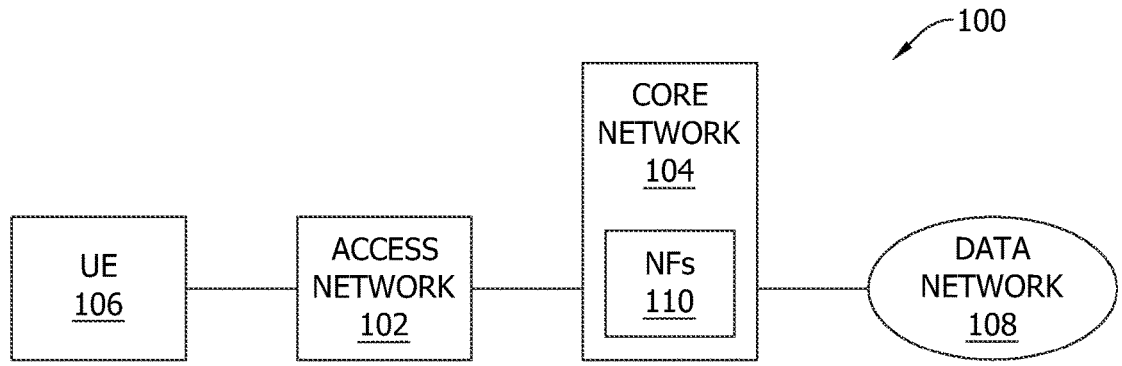
FIG. 1 illustrates a high-level architecture of a 5G system.

FIG. 1 illustrates a high-level architecture of a 5G system 100. A 5G system 100 is a communication system (e.g., a 3GPP system) comprising a 5G Access Network ((R)AN) 102, a 5G Core Network (CN) 104, and 5G User Equipment (UE) 106. Access network 102 may comprise an NG-RAN and/or non-3GPP access network connecting to a 5G core network 104. Access network 102 may support Evolved-UMTS Terrestrial Radio Access Network (E-UTRAN) access (e.g., through an eNodeB, gNodeB, and/or ng-eNodeB), Wireless Local Area Network (WLAN) access, fixed access, satellite radio access, new Radio Access Technologies (RAT), etc. Core network 104 interconnects access network 102 with a data network (DN) 108. Core network 104 is comprised of Network Functions (NF) 110, which may be implemented either as a network element on dedicated hardware, as a software instance running on dedicated hardware, as a virtualized function instantiated on an appropriate platform (e.g., a cloud infrastructure), etc. Data network 108 may be an operator external public or private data network, or an intra-operator data network (e.g., for IMS services). UE 106 is configured to register with core network 104 to access services. UE 106 may be an end user device, such as a mobile phone (e.g., smartphone), a tablet or PDA, a computer with a mobile broadband adapter, etc. UE 106 may be enabled for voice services, data services, Machine-to-Machine (M2M) or Machine Type Communications (MTC) services, and/or other services.

Figure 2:
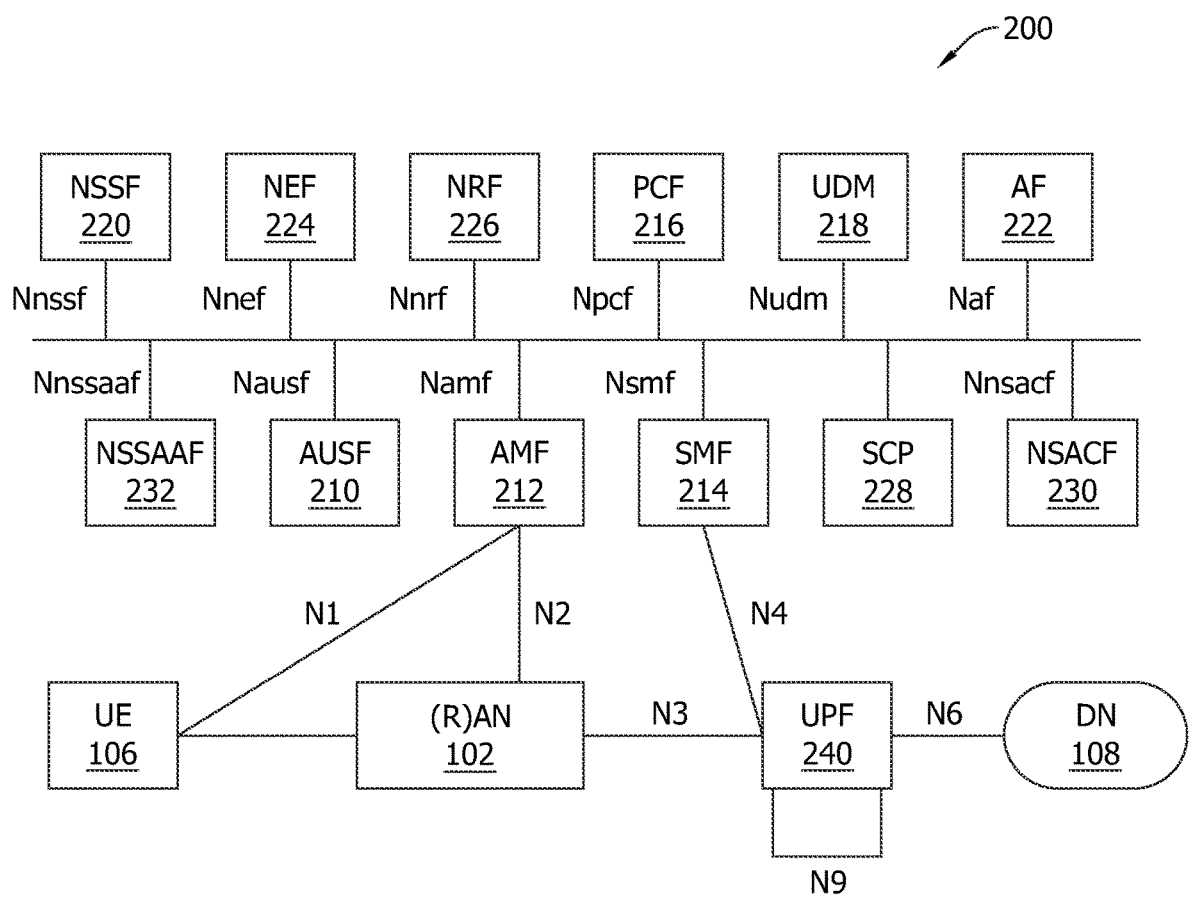
FIG. 2 illustrates a non-roaming architecture of a 5G system.

FIG. 2 illustrates a non-roaming architecture 200 of a 5G system. The architecture 200 in FIG. 2 is a service-based representation, as is further described in 3GPP TS 23.501 (v17.1.1), which is incorporated by reference as if fully included herein. Architecture 200 is comprised of Network Functions (NF) for a core network 104, and the NFs for the control plane (CP) are separated from the user plane (UP). The control plane of the core network 104 includes an Authentication Server Function (AUSF) 210, an Access and Mobility Management Function (AMF) 212, a Session Management Function (SMF) 214, a Policy Control Function (PCF) 216, a Unified Data Management (UDM) 218, a Network Slice Selection Function (NSSF) 220, and an Application Function (AF) 222. The control plane of the core network 104 further includes a Network Exposure Function (NEF) 224, a NF Repository Function (NRF) 226, a Service Communication Proxy (SCP) 228, a Network Slice Admission Control Function (NSACF) 230, and a Network Slice-specific and SNPN Authentication and Authorization Function (NSSAAF) 232. The user plane of the core network 104 includes one or more User Plane Functions (UPF) 240 that communicate with data network 108. UE 106 is able to access the control plane and the user plane of the core network 104 through (R)AN 102.

Figure 3:
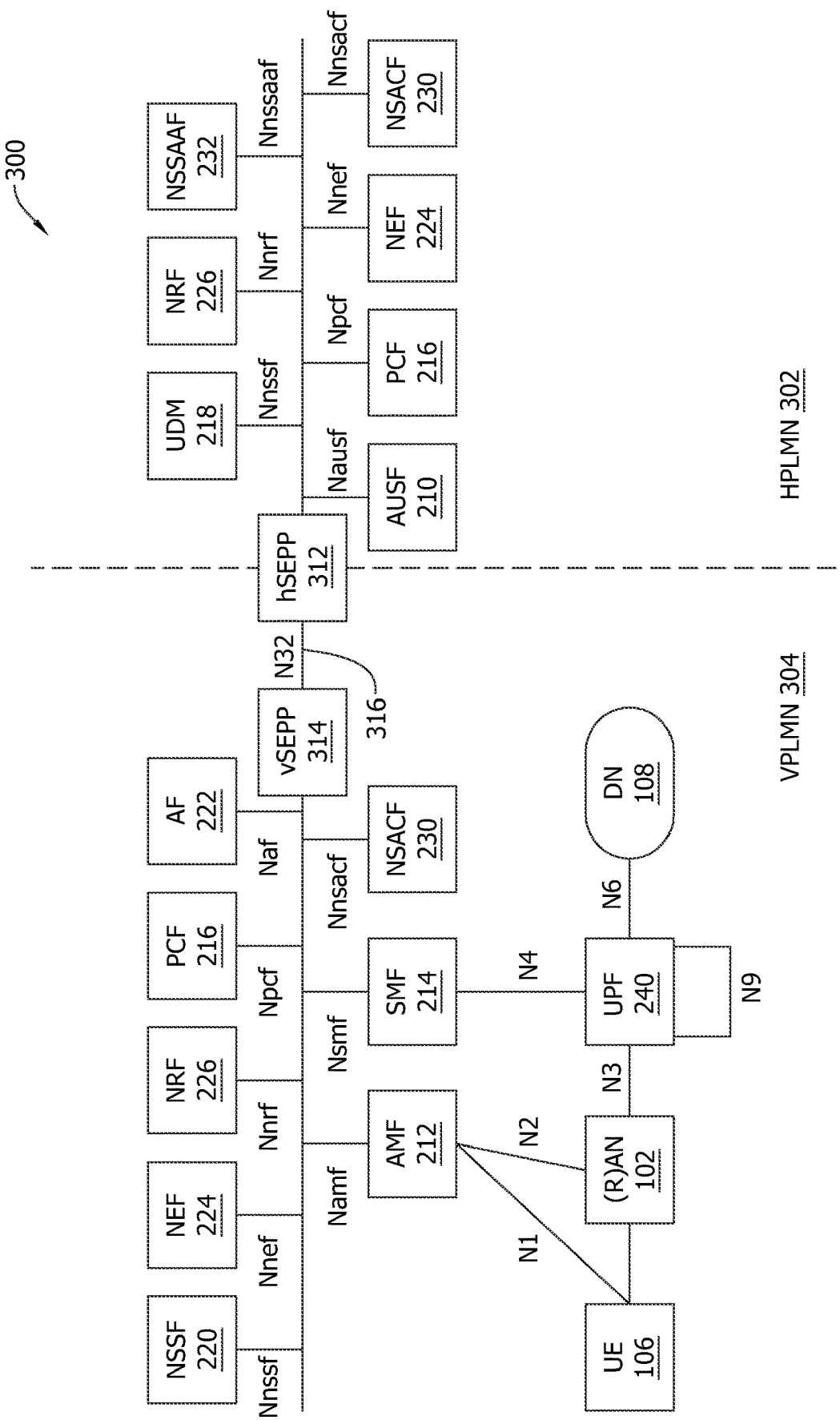
FIG. 3 illustrates a roaming architecture of a 5G system.

FIG. 3 illustrates a roaming architecture 300 of a 5G system. The roaming architecture 300 in FIG. 3 illustrates a local breakout scenario in a service-based representation, as is further described in 3GPP TS 23.501. A home PLMN (HPLMN) 302 and a serving or visited PLMN (VPLMN) 304 are shown for roaming architecture 300. An HPLMN 302 is the PLMN in which the profile of a mobile subscriber is held. A VPLMN 304 is a PLMN upon which the mobile subscriber has roamed when leaving their HPLMN 302. A local breakout (LBO) is a roaming scenario for a Protocol Data Unit (PDU) Session where the PDU Session Anchor and its controlling SMF 214 are located in the serving PLMN (VPLMN 304). Data traffic is routed directly from the VPLMN 304 to the data network 108 while authentication and handling of subscription data is handled in HPLMN 302. Thus, only signaling is routed to HPLMN 302.

In 5G roaming, a SEPP acts as a service relay between VPLMN 304 and HPLMN 302 for providing a secured connection as well as hiding the network topology. Thus, roaming architecture 300 further includes a SEPP 312 in HPLMN 302 (also referred to as hSEPP), and a SEPP 314 in VPLMN 304 (also referred to as a vSEPP), with an N32 interface 316 between SEPP 312 and SEPP 314.

Figure 4:
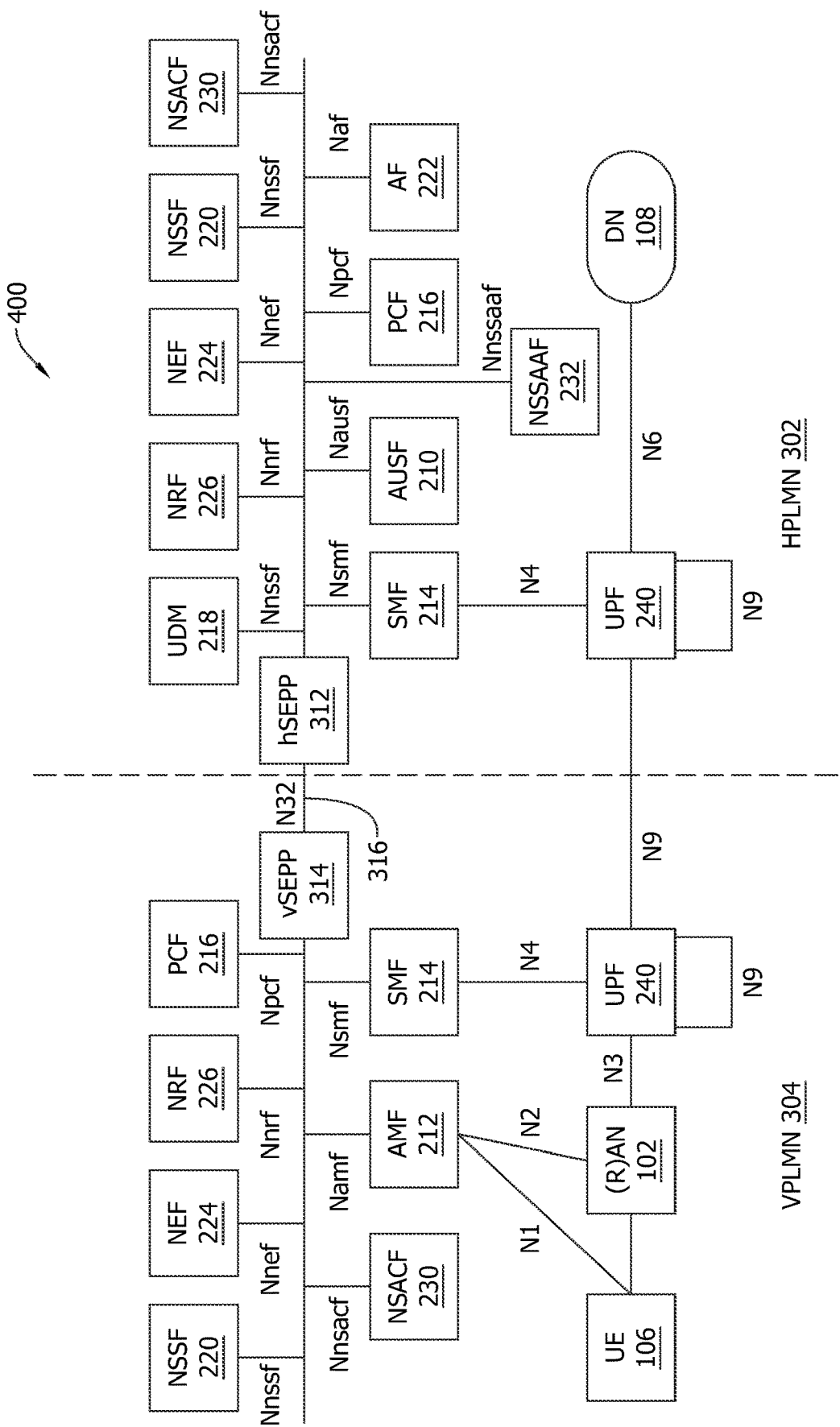
FIG. 4 illustrates another roaming architecture of a 5G system.

FIG. 4 illustrates another roaming architecture 400 of a 5G system. The roaming architecture 400 in FIG. 4 illustrates a home routed scenario in a service-based representation, as is further described in 3GPP TS 23.501. In a home routed scenario, data traffic from VPLMN 304 is routed to data network 108 via HPLMN 302. Along with the signaling data, bearer data is also routed to HPLMN 302. As above, roaming architecture 400 includes a SEPP 312 in HPLMN 302 and a SEPP 314 in VPLMN 304, with an N32 interface 316 between SEPP 312 and SEPP 314.

The 5G architecture is based on a Service-Based Architecture (SBA), which is delivered by a set of interconnected Network Functions (NFs), with authorization to access each other's services. The roles of NFs with the 5GC may be defined as a service consumer and a service producer. An NF service producer is an NF that exposes a service, and an NF service consumer is an NF that requests a service. The NRF 226 stores the NF profiles of the NF service producers, and the NF service consumers are able to query the NRF 226 with a discovery function to obtain the NF profiles of the NF service producers.

Figure 5:
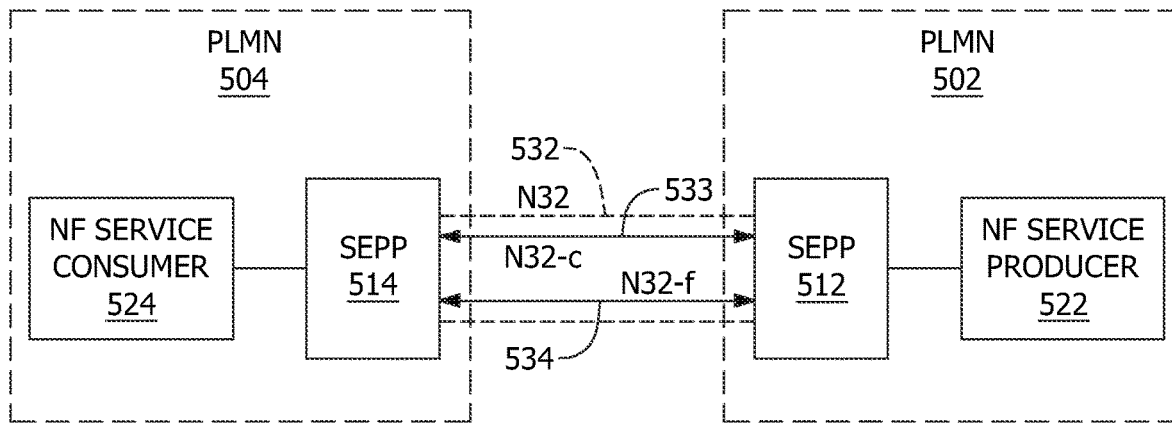
FIG. 5 illustrates inter-PLMN communications.

FIG. 5 illustrates inter-PLMN communications between a PLMN 502 and PLMN 504. It is assumed that there is a service agreement or roaming agreement between PLMN 502 and PLMN 504. An NF service producer 522 is shown in a PLMN 502 (e.g., an HPLMN 302), and an NF service consumer 524 is shown in another PLMN 504 (e.g., a VPLMN 304). To enable a secure interconnect between PLMN 502 and PLMN 504, a SEPP 512 is implemented in PLMN 502 and a SEPP 514 is implemented in PLMN 504. As described above, a SEPP is a non-transparent proxy that supports message filtering and policing on inter-PLMN control plane interfaces, and topology hiding. Thus, the SEPP protects the connection between NF service consumers and NF service producers from a security perspective. A SEPP applies message filtering and policing to every CP message in inter-PLMN signaling, acting as a service relay between the actual NF service producer and the actual NF service consumer.

The N32 interface 532 is used between the SEPPs of a VPLMN and a HPLMN in roaming scenarios, as is described in 3GPP TS 29.573 (v17.1.0), which is incorporated by reference as if fully included herein. The SEPP that is on the NF service consumer side may be referred to as the c-SEPP, and the SEPP that is on the NF service producer side may be referred to as the p-SEPP. The NF service consumer 524 (or Service Communication Proxy (SCP)) may be configured with the c-SEPP or discover the c-SEPP by querying the NRF 226. The NF service producer 522 (or SCP) may be configured with the p-SEPP or discover the p-SEPP by querying the NRF 226. The N32 interface 532 can be logically considered as two separate interfaces: the N32-c interface 533 and the N32-f interface 534. The N32-c interface 533 is a control plane interface between the SEPPs that provides an initial handshake procedure, and negotiation and parameter exchange for the actual N32 message forwarding. The N32-f interface 534 is used to forward the HTTP/2 messages of the NF service producers and the NF service consumers in different PLMNs, through the SEPPs of the respective PLMNs. The application layer security protection functionality of the N32-f interface 534 is used if the PRotocol for N32 INterconnect Security (PRINS) is negotiated between the SEPPs using the N32-c interface 533. The N32-f interface 534 provides message protection of the information exchanged between the NF service consumer and the NF service producer across PLMNs by applying application layer security mechanisms, and forwarding of application layer protected messages from a SEPP in one PLMN to a SEPP in another PLMN. Forwarding application layer protected messages may involve IP Exchange Service (IPX) providers (not shown in FIG. 5) on the signaling path. If IPX intermediaries/providers are on the path from SEPP 512 in PLMN 502 to SEPP 514 in PLMN 504, the forwarding on the N32-f interface 534 may involve the insertion of content modification instructions that the receiving SEPP applies after verifying the integrity of such modification instructions. If Transport Layer Security (TLS) is the negotiated security policy between the SEPPs, then the N32-f interface 534 involves only the forwarding of the HTTP/2 messages of the NF service producers and the NF service consumers without any reformatting.

The N32 interface 532 uses Transmission Control Protocol (TCP) as the transport protocol as required by HTTP/2. The scope of the HTTP/2 connection used for the N32-c interface 533 is short-lived. When the initial handshake is completed, the connection is torn down. The HTTP/2 connection used for the N32-c interface 533 is end-to-end between the SEPPs, and does not involve an IPX to intercept the HTTP/2 connection, though an IPX may be involved for IP level routing. The scope of the HTTP/2 connection used for the N32-f interface 534 is long-lived. The HTTP/2 connection used for the N32-f interface 534 may be towards a SEPP of another PLMN without involving any IPX intermediaries, or towards a SEPP of another PLMN via an IPX intermediary. When there is no IPX between the SEPPs, TLS is used for security protection. When there is an IPX intermediary between the SEPPs, TLS or NDS/IP is used for security protection. Further, JavaScript Object Notation (JSON) format is used as the serialization protocol.

The procedures on the N32 interface 532 are split into two categories: (1) procedures that happen end-to-end between the SEPPs on the N32-c interface 533, and (2) procedures that are used for forwarding of messages on the service based interface between the NF service consumer 524 and the NF service producer 522 via the SEPP across the N32-f interface 534. A handshake procedure (i.e., N32 Handshake Application Programming Interface (API)) for the N32-c interface 533 is used between the SEPPs in two PLMNs to mutually authenticate each other and negotiate the security mechanism to use over the N32-f interface 534 along with associated security configuration parameters. An HTTP/2 connection is established between the initiating SEPP and the responding SEPP end-to-end over TLS. The handshake procedure includes a security capability negotiation procedure, a parameter exchange procedure, an N32-f context termination procedure, and an N32-f error reporting procedure.

Figure 6:
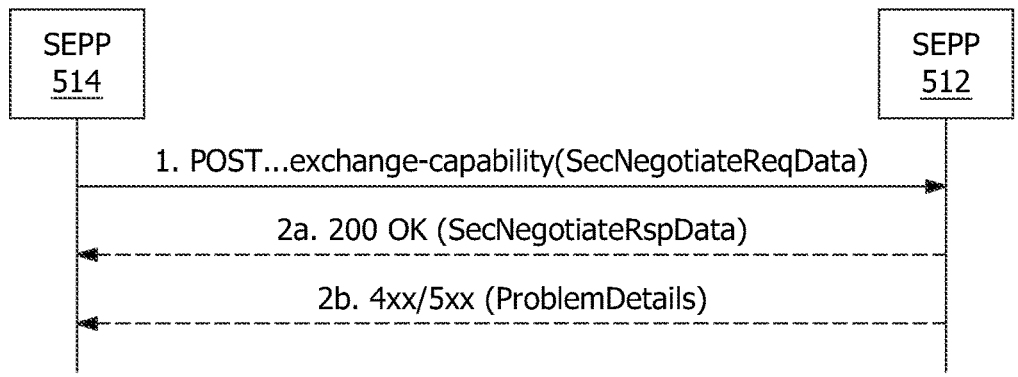
FIG. 6 is a signaling diagram of a security capability negotiation procedure over the N32-c interface.

FIG. 6 is a signaling diagram of a security capability negotiation procedure over the N32-c interface 533. The initiating (or sending) SEPP 514 initiates a security capability negotiation procedure towards the responding (or receiving) SEPP 512 to agree on a security mechanism to use for protecting NF service-related signaling over the N32-f interface 534 (as is described in 3GPP TS 29.573). The initiating SEPP 514 issues an HTTP POST request towards the responding SEPP 512 with the request body containing the "SecNegotiateReqData" Information Element (IE). The IE carries the supported security capabilities (i.e., PRINS and/or TLS), whether the 3gpp-Sbi-Target-apiRoot HTTP header is supported (if TLS security is supported), and the sender PLMN ID(s). On successful processing of the request, the responding SEPP 512 responds to the initiating SEPP 514 with a "200 OK" status code and a POST response body that contains the "SecNegotiateRspData" IE. The IE carries the selected security capability (i.e., PRINS or TLS), whether the 3gpp-Sbi-Target-apiRoot HTTP header is supported, and the sender PLMN ID(s). The responding SEPP 512 compares the supported security capabilities of the initiating SEPP 514 to its own supported security capabilities and selects a security mechanism based on a local policy that is supported by both SEPPs. If the selected security capability indicates any other capability other than PRINS, then the HTTP/2 connection initiated between the two SEPPs for the N32 handshake procedures is terminated. If the selected security capability is PRINS, then the two SEPPs may decide to create or maintain HTTP/2 connection(s) where each SEPP acts as a client towards the other (which acts as a server). On failure, the responding SEPP 512 responds to the initiating SEPP 514 with an appropriate 4xx/5xx status code.

After the security capability negotiation procedure is performed, the parameter exchange procedure is executed if the security capability negotiation procedure selected the security capability as PRINS. The parameter exchange procedure is performed to agree on a cipher suite to use for protecting NF service related signaling over the N32-f interface 534, and optionally exchange the protection policies to use for protecting NF service related signaling.

After completion of the security capability negotiation procedure and/or the parameter exchange procedures, an N32-f context is established between the two SEPPs. A context identifier (i.e., "n32fContextId") of each SEPP is provided to the other SEPP. This context identifier is stored in each SEPP until the N32-f context is explicitly terminated by the N32-f context termination procedure. The N32-f context, among other things, indicates the PLMN ID(s) of the initiating SEPP 514 (also PLMN ID(s) of NF service consumer 524).

A protected message forwarding procedure (i.e., Javascript Object Signing and Encryption (JOSE) Protected Message Forwarding API) is used for forwarding messages across the N32-f interface 534. If the negotiated security capability between the two SEPPs is PRINS as described above for the handshake procedure, one or more HTTP/2 connections between the two SEPPs for the forwarding of JOSE protected messages is established for the N32-f interface 534, which may involve IPX intermediaries/providers on the signaling path. The forwarding of messages over the N32-f interface 534 involves the following steps at the initiating SEPP: (1) identification of the protection policy applicable for the API being invoked (i.e., either a request/response NF service API, a subscribe/unsubscribe service API, or a notification API), (2) message reformatting as per the identified protection policy, and (3) forwarding of the reformatted message over the N32 interface 532. Regarding message reformatting, a SEPP on the sending side PLMN applies message reformatting when it receives an HTTP/2 request message from an NF service consumer to an NF service producer in another PLMN, when it receives an HTTP/2 response message from an NF service producer to an NF service consumer in another PLMN, when it receives an HTTP/2 notification request message from an NF service producer to an NF service consumer in another PLMN, or when it receives an HTTP/2 notification response message from an NF service consumer to an NF service producer in another PLMN. The SEPP reformats the HTTP/2 message by encapsulating the whole message into the body of a new HTTP POST message. The body of the HTTP POST request/ response message contains the reformatted original HTTP/2 request/response message, respectively. HTTP header and payload are encrypted based on the protection policy exchanged between the SEPPs.

Figure 7:
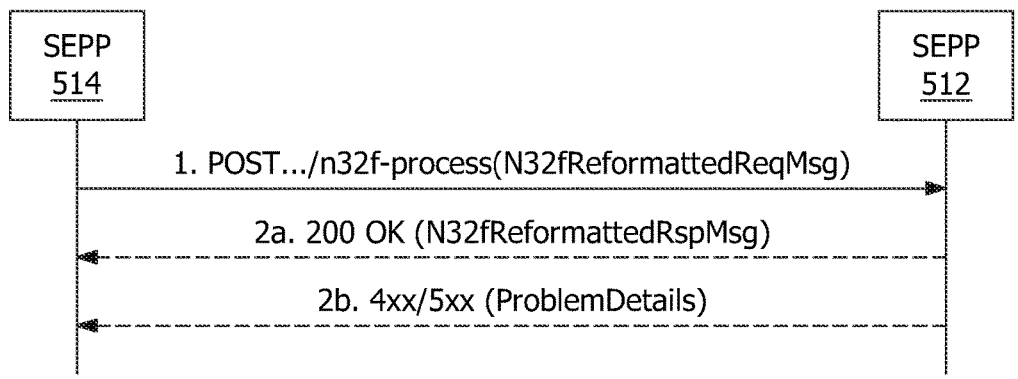
FIG. 7 is a signaling diagram of message forwarding over the N32-f interface.

After a SEPP reformats the HTTP/2 message, the initiating SEPP forwards the reformatted message over the N32 interface 532 to the responding SEPP. FIG. 7 is a signaling diagram of message forwarding over the N32-f interface 534. The initiating SEPP 514 issues an HTTP POST request towards the responding SEPP 512 with the request body containing the reformatted HTTP/2 message. The request message contains the N32 context identifier provided by the responding SEPP 512 to the initiating SEPP 514 earlier during the parameter exchange procedure. The responding SEPP 512 uses the N32 context identifier to locate the agreed cipher suite and protection policy, and processes the request message. On successful processing of the request message, the responding SEPP 512 decompresses the HTTP request payload (if it is compressed), reconstructs the HTTP/2 message, and forwards the reconstructed HTTP/2 message to the NF service producer. The responding SEPP 512 waits for a response from the NF service producer, and then responds to the initiating SEPP 514 with a "200 OK" status code and a POST response body that contains the response ("N32ReformattedRspMsg"). The response contains the reformatted HTTP response message from the responding PLMN 502. The response message also contains the context identifier provided by the initiating SEPP 514 to the responding SEPP 512 earlier during the parameter exchange procedure. On failure, the responding SEPP 512 responds to the initiating SEPP 514 with an appropriate 4xx/5xx status code.

Processing of a message received over the N32-f interface 534 at the responding SEPP 512 involves the following steps: (1) identify the N32-f context using the context identifier received in the message, (2) verify the integrity protection (also referred to as integrity verification) of the message using the keying material obtained from the TLS layer during the parameter exchange procedure for the N32-f context, (3) decrypt the ciphertext part of the message and decode the "aad" part of the message, and (4) form the original request/response body from the decrypted ciphertext and the decoded integrity verified "aad" block. The processing further includes the following step: (5) if the reconstructed HTTP message has an "Authorization" header, then the responding SEPP 512 determines whether the PLMN ID of the NF service consumer is present in the Bearer token contained in the Authorization header, and whether the PLMN ID matches the "Remote PLMN ID" of the N32-f context. If the PLMN ID of the NF service consumer is present in the reconstructed HTTP message, then the responding SEPP 512 compares the PLMN ID of the service consumer with the PLMN ID retrieved from the N32-f context. If the PLMN IDs do not match, then the responding SEPP 512 responds to the initiating SEPP 514 with a "403 Forbidden" status code with the application specific cause set as "PLMNID_MISMATCH".

When there are roaming agreements between two PLMNs as discussed above, the SEPPs of the two PLMNs may communicate directly with one another over the N32 interface 532. Assume, for example, that one Mobile Network Operator (MNO), also known as a wireless service provider, wireless carrier, mobile network carrier, etc., owns or controls PLMN 504 (see FIG. 5), and another MNO owns or controls PLMN 502. If there are roaming or service agreements between these MNOs, then security mechanisms and protection policies are in place, testing has been performed, and the like so that PLMN 504 is trusted to PLMN 502, and vice-versa. When PLMNs are trusted with a bilateral agreement, SEPPs are able to communicate with one another over the N32 interface 532 as discussed above (see FIG. 5).

There are situations where a PLMN may not have a roaming agreement with another PLMN, so their SEPPs cannot directly interact over the N32 interface. However, it may be desirable to offer roaming services between the PLMNs even though a roaming agreement is not in place. In such situations, an intermediate hub (or multiple intermediate hubs) may be used between the PLMNs. An intermediate hub (also referred to as a roaming hub) comprises one or more network nodes or entities, servers, circuitry, logic, hardware, means, etc., implemented in a signaling path between a SEPP of one PLMN or roaming hub and a SEPP of another PLMN or roaming hub, that is configured to relay messages between the SEPPs. The roaming hub is configured to support a secure interconnect between PLMNs that do not have a roaming agreement or that do not have direct N32-c connectivity. The roaming hub is a commercial entity that can be contracted by a network operator to enable quick and efficient access to a wide range of roaming agreements. The roaming hub has a number of roaming agreements and technical interconnections that are already fully negotiated and operational with other network operators and the contracting network operator "buys in" to these agreements (some or all of them). As negotiating roaming agreements with the full range of network operators in the world can take a substantial amount of time and resources, some contracting network operators use a roaming hub to get quick access to a wide roaming footprint. Roaming hubs are acting on behalf of the contracting operators from the commercial and technical point of view and have financial liability for roaming agreements enabled through them. When roaming hubs are used, the commercial agreements are not directly between the network operators, but between the roaming hub and the home and visited network operator.

Figure 8:
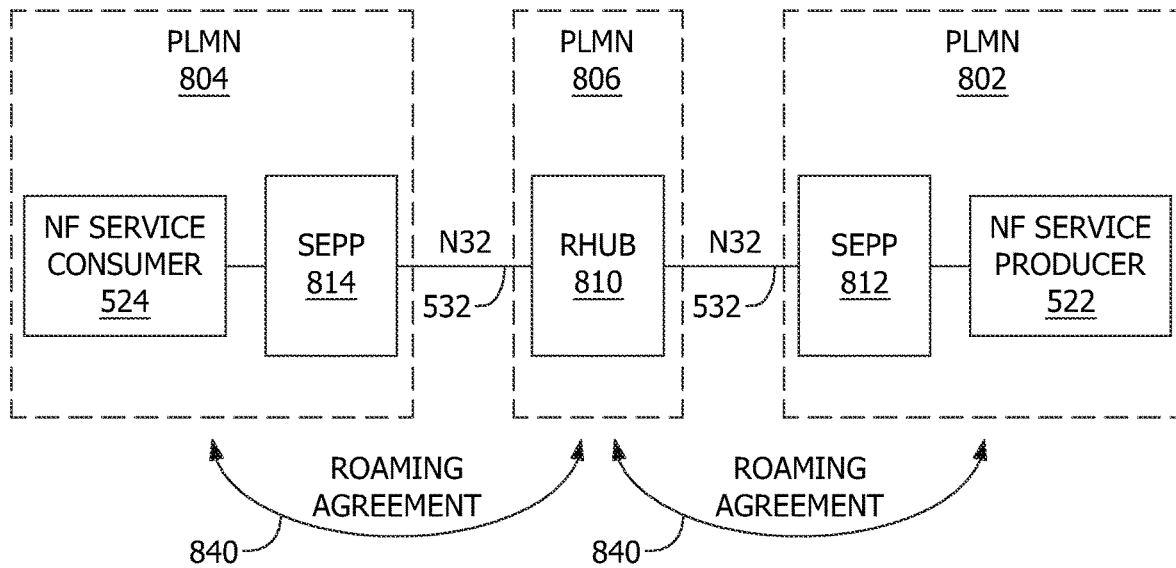
FIG. 8 illustrates inter-PLMN communications for a roaming scenario in an illustrative embodiment.

FIG. 8 illustrates inter-PLMN communications for a roaming scenario in an illustrative embodiment. An NF service producer 522 is shown in a PLMN 802 (e.g., an HPLMN 302), and an NF service consumer 524 is shown in another PLMN 804 (e.g., a VPLMN 304). A SEPP 812 is implemented in PLMN 802 on the service producer side, and a SEPP 814 is implemented in PLMN 804 on the service consumer side. In this embodiment, it is assumed that there is no roaming agreement between the MNO of PLMN 802, and the MNO of PLMN 804. Thus, a roaming hub (RHUB) 810 is implemented between SEPP 812 and SEPP 814 (i.e., in the signaling path between SEPP 812 and SEPP 814) to relay messages between SEPP 812 and SEPP 814. Roaming hub 810 is an external entity from SEPP 812 and SEPP 814, and is outside the network domain of PLMN 802 and the network domain of PLMN 804. Roaming hub 810 is illustrated at being part of PLMN 806 in this embodiment, which is an intermediate PLMN between PLMN 802 and PLMN 804. But, roaming hub 810 may provide an interconnect service outside of a PLMN in other embodiments. Although one roaming hub 810 is illustrated in the signaling path between SEPP 812 and SEPP 814 in FIG. 8, more than one roaming hub 810 may be in the signaling path in other embodiments.

In this embodiment, there is a roaming agreement 840 between the MNO of PLMN 802 and roaming hub 810 (or a provider of roaming hub 810). Thus, an N32 interface 532 may be established between roaming hub 810 and SEPP 812 of PLMN 802. Also, there is a roaming agreement 840 between the MNO of PLMN 804 and roaming hub 810. Thus, an N32 interface 532 may be established between roaming hub 810 and SEPP 814 of PLMN 804.

When a roaming hub 810 is implemented in the signaling path between SEPP 812 and SEPP 814 in this manner, a problem may be encountered when the protected message forwarding procedure (i.e., JOSE Protected Message Forwarding API) is used for forwarding of messages across the N32-f interface 534. As described above, an initiating SEPP on the sending side PLMN receives an HTTP/2 request message from an NF service consumer to an NF service producer in another PLMN. The initiating SEPP reformats the HTTP/2, and forwards the reformatted message over the N32 interface 532 to the receiving SEPP (see FIG. 7). When the responding SEPP receives the message, the responding SEPP identifies the N32-f context using the context identifier received in the message, verifies the integrity protection of the message, decrypts the ciphertext part of the message and decodes the "aad" part of the message, and forms the original request/response body from the decrypted ciphertext and the decoded integrity verified "aad" block. If the reconstructed HTTP message has an "Authorization" header, then the responding SEPP determines whether the PLMN ID of the NF service consumer is present in the Bearer token contained in the Authorization header, and whether the PLMN ID matches the "Remote PLMN ID" of the N32-f context. If the PLMN IDs do not match, then the responding SEPP responds to the initiating SEPP with a "403 Forbidden" status code with the application specific cause set as "PLMNID_MISMATCH".

When a roaming hub 810 is implemented in the signaling path between SEPP 812 and SEPP 814 as in FIG. 8, a message may be routed from SEPP 814 to SEPP 812, for example, through roaming hub 810. In this scenario, there is one N32-f context between SEPP 812 and roaming hub 810, and another N32-f context between roaming hub 810 and SEPP 814. But, there is no N32-f context directly between SEPP 812 and SEPP 814. Assume, for example, that SEPP 814 is an initiating SEPP, and SEPP 812 is a responding SEPP for the purpose of N32 procedures. Because there is no N32-f context between SEPP 812 and SEPP 814, the responding SEPP (e.g., SEPP 812) does not have a PLMN ID for the initiating SEPP (e.g., SEPP 814) or service consumer. Thus, if the responding SEPP (e.g., SEPP 812) were to receive a message initiated by SEPP 814 and routed through roaming hub 810 as in FIG. 8, the responding SEPP would not be able to verify the PLMN ID in the Bearer token of the Authorization header in the message, and would respond with a "403 Forbidden" status code with the application specific cause set as "PLMNID_MISMATCH".

It is noted that FIG. 8 is an illustrative example, and there may be more elaborate configurations. For example, there may be multiple roaming hubs in the signaling path between a PLMN hosting an NF service consumer issuing a request and a PLMN hosting an NF service producer serving this request. As an example, the PLMN hosting the NF service consumer may have an agreement with a first roaming hub, the PLMN hosting the NF service producer may have an agreement with a second roaming hub, and the two roaming hubs may have an agreement. In that case, the signaling path may contain the NF service consumer and a SEPP in the consumer PLMN, the first roaming hub, the second roaming hub, and a SEPP and NF service producer in the producer PLMN.

To solve this and/or other problems, message forwarding procedures are enhanced in the embodiments described herein. As an overview, one or more HTTP custom headers are defined for HTTP/2 protocol that are supported on the N32 interface 532. An HTTP custom header as defined herein may indicate a PLMN of a sending entity (i.e., provide a PLMN ID of the sending PLMN) that is validated by the roaming hub (e.g., roaming hub 810). The same or another HTTP custom header as defined herein may indicate the roaming hub (e.g., provide a roaming hub ID) that relays or forwards a message. When a message is received at roaming hub 810 and needs to be relayed, roaming hub 810 is configured to add the HTTP custom header(s) to the message, and/or modify the HTTP custom header(s) if already present in the message. The roaming hub 810 is further configured to integrity protect the HTTP custom header(s), and forward the message. One technical benefit is that when the message is subsequently received at a responding SEPP, the responding SEPP may process the HTTP custom header(s) to identify one or more PLMNs that have been validated by a roaming hub (or hubs) between the responding SEPP and the initiating SEPP. More particularly, the responding SEPP may compare the PLMN ID(s) contained the HTTP custom header(s) with the PLMN ID present in the Bearer token contained in the Authorization header of the message. Thus, verification of the Bearer token can be successful when the PLMN ID(s) contained in the HTTP custom header(s) matches the PLMN ID contained in the Bearer token, even though the PLMN ID of the service consumer is not present in an N32-f context of the responding SEPP. Another technical benefit is the information contained in the HTTP custom header(s) may be used for charging, troubleshooting, or other functions.

Figure 9:
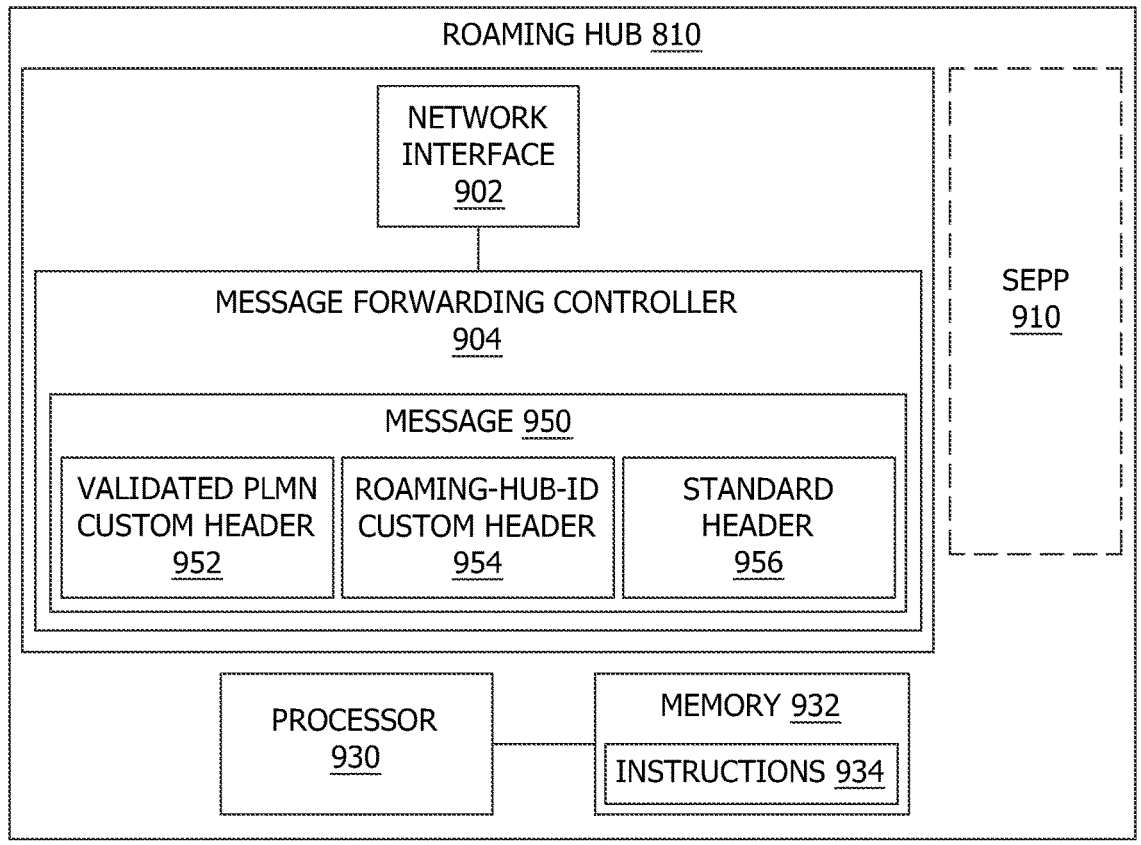
FIG. 9 is a block diagram of roaming hub in an illustrative embodiment.

FIG. 9 is a block diagram of roaming hub 810 in an illustrative embodiment. In this embodiment, roaming hub 810 includes the following subsystems: a network interface component 902, and a message forwarding controller 904. Network interface component 902 is a hardware component that exchanges messages, signaling, or packets with other elements, such as a SEPP and/or other systems. For example, network interface component 902 may be configured to communicate over the N32 interface. Message forwarding controller 904 comprises circuitry, logic, hardware, means, etc., configured to relay or forward a message 950 received from a sending entity to a receiving entity. For example, message forwarding controller 904 is configured to relay a message from a SEPP of one PLMN to a SEPP of another PLMN. As will be described in more detail below, message forwarding controller 904 is configured to add or modify one or more HTTP custom headers (e.g., headers 952 and 954) of the message 950.

One or more of the subsystems of roaming hub 810 may be implemented on a hardware platform comprised of analog and/or digital circuitry. One or more of the subsystems of roaming hub 810 may be implemented on a processor 930 that executes instructions 934 stored in memory 932. Processor 930 comprises an integrated hardware circuit configured to execute instructions 934, and memory 932 is a non-transitory computer readable storage medium for data, instructions 934, applications, etc., and is accessible by processor 930.

In one embodiment, roaming hub 810 may comprise or include a SEPP 910 as illustrated in FIG. 9.

Roaming hub 810 may include various other components or sub-systems not specifically illustrated in FIG. 9.

Figure 10:
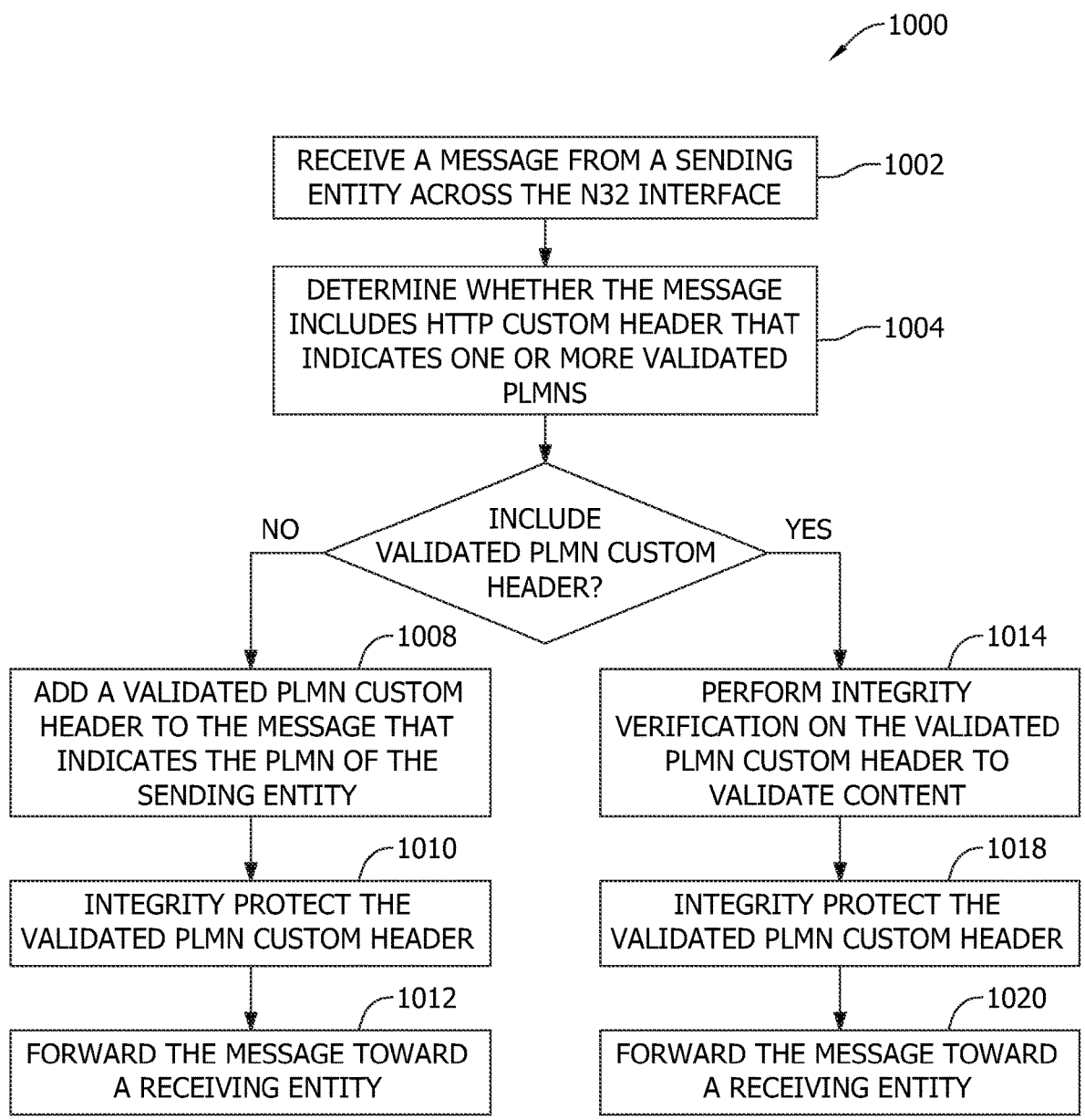
FIG. 10 is a flow chart illustrating a method of message forwarding in inter-PLMN communications in an illustrative embodiment.

FIG. 10 is a flow chart illustrating a method 1000 of message forwarding in inter-PLMN communications in an illustrative embodiment. The steps of method 1000 will be described with reference to roaming hub 810 in FIG. 9, but those skilled in the art will appreciate that method 1000 may be performed in other intermediate hubs or systems. The steps of the flow charts described herein are not all inclusive and may include other steps not shown, and the steps may be performed in an alternative order.

Assume for this embodiment that an NF service consumer 524 in PLMN 804 (see FIG. 8) discovers an NF service producer 522 in PLMN 802, and initiates a message toward NF service producer 522. The message may comprise a service request message, a notification request message, etc. N32-f contexts are established between SEPP 814 and roaming hub 810, and between roaming hub 810 and SEPP 812. SEPP 814 receives the message initiated by NF service consumer 524, and forwards the message to roaming hub 810 over the N32 interface 532.

Roaming hub 810 (through network interface component 902) receives the message 950 from a sending entity across the N32 interface 532 (step 1002). It is assumed that a roaming agreement exists between roaming hub 810 and the sending entity so that an N32-f context may be established between roaming hub 810 and the sending entity. In the example shown in FIG. 8, the sending entity comprises SEPP 814, which is considered an initiating or sending SEPP. However, roaming hub 810 may receive the message 950 from another roaming hub in other examples, which is relaying the message 950 between an initiating SEPP and a responding SEPP.

Roaming hub 810 (through message forwarding controller 904) determines whether the message 950 includes an HTTP custom header that indicates a PLMN (or multiple PLMNs) that is validated (step 1004). The HTTP custom header may be referred to as a "validated PLMN" custom header, "ValidatedPLMNIDlist" custom header, or the like. HTTP/2 includes HTTP standard headers that are supported on the N32 interface 532, such as defined in 3GPP TS 29.573. HTTP/2 also allows for HTTP custom headers that are supported on the N32 interface 532 (e.g., defined for the JOSE protected message forwarding API on the N32 interface). As described above, one or more HTTP custom headers are defined herein for a message forwarding procedure on the N32 interface 532. A validated PLMN custom header 952 as defined herein indicates one or more PLMNs that are validated between a SEPP 814 on the NF service consumer side and a SEPP 812 on the NF service producer side. For example, the validated PLMN custom header 952 may provide a list of PLMN IDs for one or more PLMNs that are validated in the signaling path between the initiating SEPP 814 and the responding SEPP 812.

When the message 950 as received does not include a validated PLMN custom header 952, roaming hub 810 adds or appends a validated PLMN custom header 952 to the message 950 that indicates the PLMN of the sending entity (step 1008) (i.e., the PLMN from which the roaming hub 810 received the message 950). For example, due to the roaming agreement 840 between roaming hub 810 and PLMN 804 in FIG. 8, PLMN 804 is trusted to roaming hub 810. Thus, roaming hub 810 is able to add the validated PLMN custom header 952 to the message 950 that indicates PLMN 804. Roaming hub 810 also integrity protects the validated PLMN custom header 952 (step 1010). In other words, roaming hub 810 signs or applies a signature to the validated PLMN custom header 952 to add or apply integrity protection. Roaming hub 810 may integrity protect the validated PLMN custom header 952 using an integrity algorithm and associated integrity keys (public and/or private keys) that are exchanged during negotiation and parameter exchange over the N32-c interface 533.

Roaming hub 810 forwards the message 950 toward a receiving entity (step 1012). It is assumed that a roaming agreement exists between roaming hub 810 and the receiving entity so that an N32-f context may be established between roaming hub 810 and the receiving entity. In the example shown in FIG. 8, the receiving entity may comprise SEPP 812, which is considered a responding or receiving SEPP. However, roaming hub 810 may forward the message 950 to another roaming hub or intermediate proxy in other examples.

When the message 950 as received includes a validated PLMN custom header 952, it is assumed that the validated PLMN custom header 952 is integrity protected by the sending entity. Thus, roaming hub 810 performs integrity verification on the validated PLMN custom header 952 to validate content of the validated PLMN custom header 952 (step 1014). For example, roaming hub 810 may use an integrity algorithm and associated integrity keys (public and/or private keys) that are exchanged with the sending entity during negotiation and parameter exchange over the N32-c interface 533, to verify the integrity of the validated PLMN custom header 952. Roaming hub 810 integrity protects the validated PLMN custom header 952 in the message 950 (step 1018). In other words, roaming hub 810 signs or applies a signature to the validated PLMN custom header 952 to add or apply integrity protection. Roaming hub 810 forwards the message 950 toward the receiving entity (step 1020).

In another embodiment, another HTTP custom header defined for a message forwarding procedure on the N32 interface 532 may indicate one or more roaming hubs that relayed or forwarded the message. For example, this HTTP custom header may provide a list of roaming hubs that relayed the message along the signaling path between the initiating SEPP 814 and the responding SEPP 812.

Figure 11:
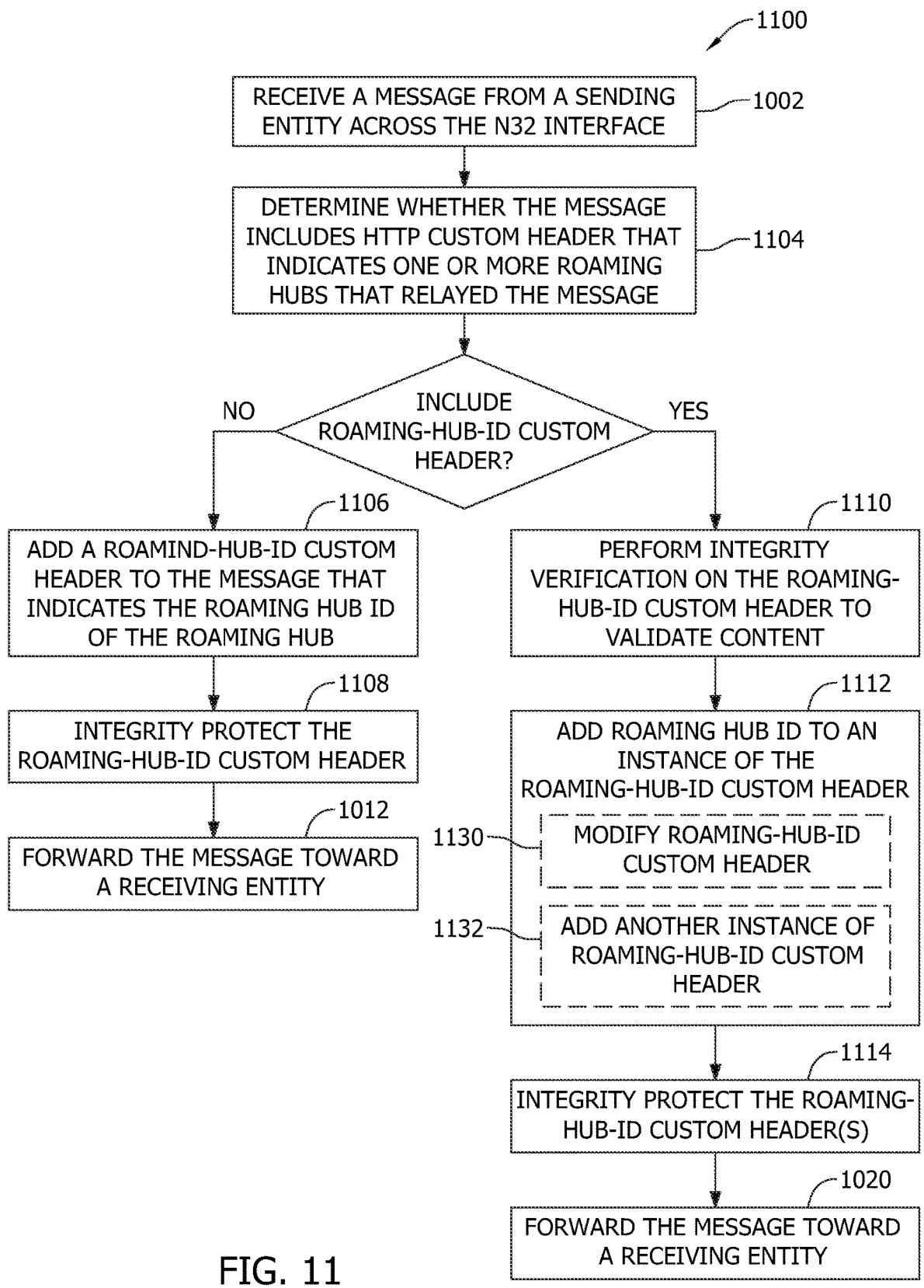
FIG. 11 is a flow chart illustrating another method of message forwarding in an illustrative embodiment.

FIG. 11 is a flow chart illustrating another method 1100 of message forwarding in an illustrative embodiment. The steps of method 1100 may be performed in addition to the steps of method 1000, or may be performed separately. As before, roaming hub 810 (through network interface component 902) receives the message 950 from the sending entity across the N32 interface 532 (step 1002). In this embodiment, roaming hub 810 determines whether the message 950 includes an HTTP custom header that indicates one or more roaming hubs (or intermediate SEPPs) that relayed the message (step 1104). The HTTP custom header may be referred to as a "Roaming-hub-ID" custom header, "RHUB-ID" custom header, or the like. When the message as received does not include a Roaming-hub-ID custom header 954, roaming hub 810 adds or appends a Roaming-hub-ID custom header 954 to the message 950 that indicates a roaming hub ID of roaming hub 810 (step 1106). The roaming hub ID may comprise one or more of a PLMN ID of the PLMN where roaming hub 810 is implemented, a Fully Qualified Domain Name (FQDN) identifier for roaming hub 810, an Internet Protocol (IP) address for roaming hub 810, and an instance ID for roaming hub 810.

Roaming hub 810 also integrity protects the Roaming-hub-ID custom header 954 (step 1108). In other words, roaming hub 810 signs or applies a signature to the Roaming-hub-ID custom header 954 to add or apply integrity protection. Roaming hub 810 may integrity protect the Roaming-hub-ID custom header 954 in the same process as integrity protecting the validated PLMN custom header(s) 952 (see step 1010 or step 1018 of FIG. 10). In other words, roaming hub 810 may sign the validated PLMN custom header 952 and the Roaming-hub-ID custom header 954 with an indication (e.g., roaming hub ID) of roaming hub 810. Roaming hub 810 forwards the message 950 toward a receiving entity (step 1012).

When the message 950 as received includes a Roaming-hub-ID custom header 954, it is assumed that the Roaming-hub-ID custom header 954 is integrity protected by the sending entity. Thus, roaming hub 810 performs integrity verification on the Roaming-hub-ID custom header 954 to validate the content of the Roaming-hub-ID custom header 954 (step 1110). For example, roaming hub 810 may use an integrity algorithm and associated integrity keys (public and/or private keys) that are exchanged with the sending entity during negotiation and parameter exchange over the N32-c interface 533, to verify the integrity of the Roaming-hub-ID custom header 954. Roaming hub 810 adds its roaming hub ID to an instance of the Roaming-hub-ID custom header 954 (step 1112). In one embodiment, the Roaming-hub-ID custom header 954 may be defined to indicate a list of multiple roaming hub IDs. Thus, the message 950 may include a single occurrence of the Roaming-hub-ID custom header 954. In this embodiment, roaming hub 810 may modify the present instance of the Roaming-hub-ID custom header 954 as received in the message 950 to indicate its roaming hub ID in the list (optional step 1130). In another embodiment, the Roaming-hub-ID custom header 954 may be defined to indicate a roaming hub ID of a single roaming hub. Thus, the message 950 may include multiple instances of the Roaming-hub-ID custom header 954, depending on how many intermediate proxies are in the signaling path. In this embodiment, roaming hub 810 may add or append another instance of the Roaming-hub-ID custom header 954 to the message 950 that indicates its roaming hub ID (optional step 1132).

Roaming hub 810 integrity protects the Roaming-hub-ID custom header 954 or headers in the message 950 (step 1114). Roaming hub 810 may integrity protect the Roaming-hub-ID custom header(s) 954 in the same process as integrity protecting the validated PLMN custom header(s) 952 (see step 1010 or step 1018 of FIG. 10). Roaming hub 810 forwards the message 950 toward the receiving entity (step 1020).

In one embodiment, the validated PLMN custom header 952 and the Roaming-hub-ID custom header 954 may be combined into a single header.

At some point after relaying the message 950 through one or more roaming hubs 810, the message 950 will be received at the responding SEPP 812. Responding SEPP 812 is then able to process the HTTP custom headers in the message 950.

Figure 12:
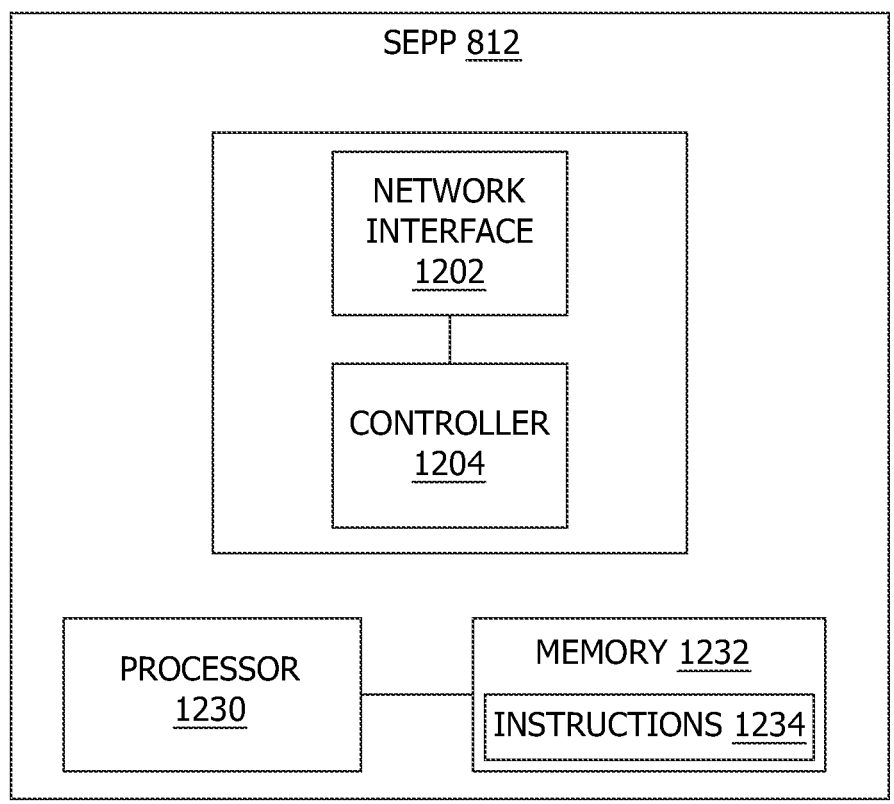
FIG. 12 is a block diagram of a SEPP in an illustrative embodiment.

FIG. 12 is a block diagram of a SEPP 812 in an illustrative embodiment. In this embodiment, SEPP 812 includes the following subsystems: a network interface component 1202, and a controller 1204. Network interface component 1202 is a hardware component that exchanges messages, signaling, or packets with other elements. Network interface component 1202 may be configured to communicate over the N32 interface. Controller 1204 comprises circuitry, logic, hardware, means, etc., configured to act as a service relay between PLMNs for providing a secured connection.

One or more of the subsystems of SEPP 812 may be implemented on a hardware platform comprised of analog and/or digital circuitry. One or more of the subsystems of SEPP 812 may be implemented on a processor 1230 that executes instructions 1234 stored in memory 1232. Processor 1230 comprises an integrated hardware circuit configured to execute instructions 1234, and memory 1232 is a non-transitory computer readable storage medium for data, instructions 1234, applications, etc., and is accessible by processor 1230.

SEPP 812 may include various other components or sub-systems not specifically illustrated in FIG. 12.

Figure 13:
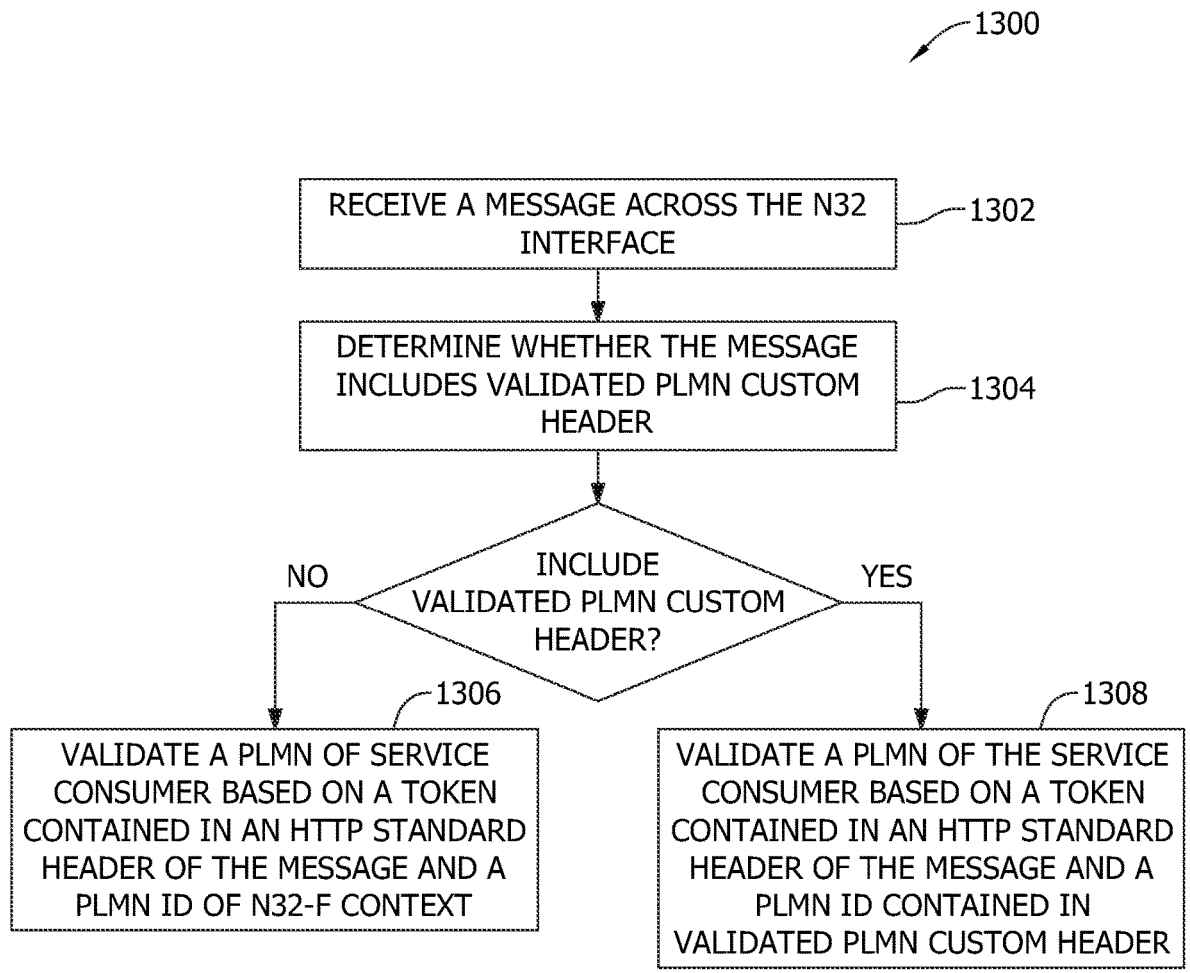
FIG. 13 is a flow chart illustrating another method of message forwarding in inter-PLMN communications in an illustrative embodiment.

FIG. 13 is a flow chart illustrating another method 1300 of message forwarding in inter-PLMN communications in an illustrative embodiment. The steps of method 1300 will be described with reference to SEPP 812 in FIG. 12, but those skilled in the art will appreciate that method 1300 may be performed in other systems.

SEPP 812 (through network interface component 1202) receives a message 950 from a sending entity across the N32 interface (step 1302). It is assumed that a roaming agreement exists between SEPP 812 and the sending entity so that an N32-f context may be established between SEPP 812 and the sending entity. In the example shown in FIG. 8, the sending entity comprises roaming hub 810. However, SEPP 812 may receive the message 950 from another SEPP in other examples.

SEPP 812 (through controller 1204) determines whether the message 950 includes a validated PLMN custom header 952 (step 1304). As described above, the validated PLMN custom header 952 as defined herein indicates one or more PLMNs that are validated between a SEPP 814 on the NF service consumer side and a SEPP 812 on the NF service producer side. For example, the validated PLMN custom header 952 may provide a list of PLMN IDs for one or more PLMNs that are validated in the signaling path between the initiating SEPP 814 and the responding SEPP 812.

Figure 14:
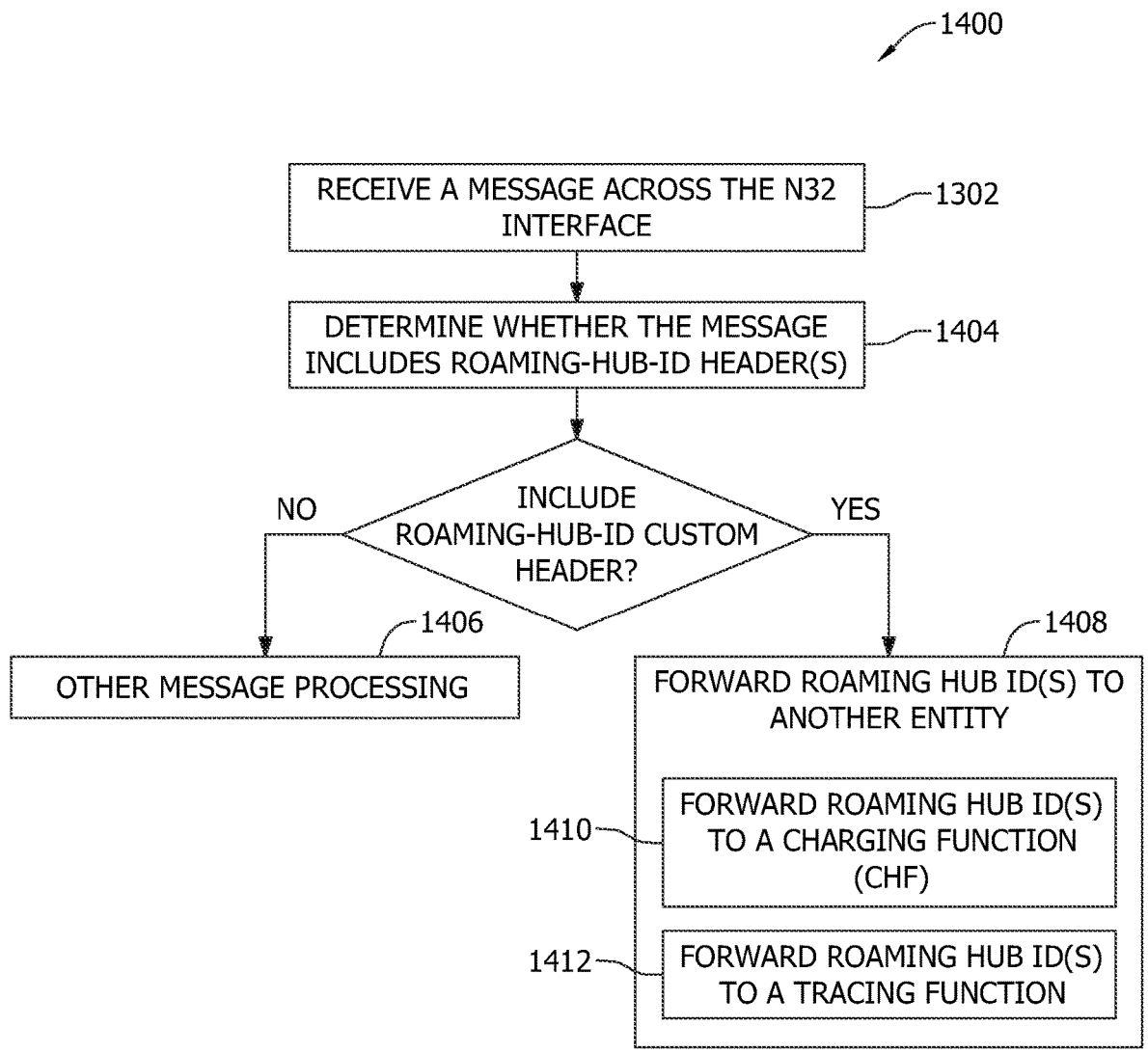
FIG. 14 is a flow chart illustrating another method of message forwarding in an illustrative embodiment.

When the message 950 as received does not include a validated PLMN custom header 952, SEPP 812 validates a PLMN of the service consumer based on a token contained in an HTTP standard header 956 of the message 950 and a PLMN ID of the N32-f context (step 1306). If the PLMN IDs match, SEPP 812 determines that the service consumer is validated. If the PLMN IDs do not match, then access token validation fails and a corresponding error will be reported. When the message 950 as received includes a validated PLMN custom header 952, SEPP 812 validates a PLMN of the service consumer based on a token contained in an HTTP standard header 956 of the message 950 and a PLMN ID contained in the validated PLMN custom header 952 (step 1308). If the PLMN IDs match, SEPP 812 determines that the service consumer is validated. If the PLMN IDs do not match, then access token validation fails and a corresponding error will be reported FIG. 14 is a flow chart illustrating another method 1400 of message forwarding in an illustrative embodiment. The steps of method 1400 may be performed in addition to the steps of method 1300, or may be performed separately. As before, SEPP 812 (through network interface component 1202) receives message 950 from the sending entity across the N32 interface (step 1302). In this embodiment, SEPP 812 determines whether the message 950 includes one or more Roaming-hub-ID custom headers 954 (step 1404). As described above, the Roaming-hub-ID custom header 954 indicates one or more roaming hubs that relayed the message. When the message 950 as received does not include a Roaming-hub-ID custom header 954, SEPP 812 may perform other message processing (step 1406) that is beyond the scope of this description. When the message 950 as received includes a Roaming-hub-ID custom header 954, SEPP 812 may extract the roaming hub ID(s) from the Roaming-hub-ID custom header(s) 954, and forward the roaming hub ID(s) to another entity in the local PLMN, such as the NF service producer 522 supporting the service requested by the message 950 or a further intermediate entity (step 1408). In one embodiment, SEPP 812 (or the NF service producer 522/proxy function (SCP)) may forward or report the roaming hub ID(s) to a Charging Function (CHF) (optional step 1410). Thus, this information carried in the Roaming-hub-ID custom header(s) 954 may assist with charging for a service. In one embodiment, SEPP 812 may forward or report the roaming hub ID(s) to a tracing function of the 5GC (optional step 1412). Thus, this information carried in the Roaming-hub-ID custom header(s) 954 may assist with troubleshooting in the network, such as for invoking a trace action.

Figure 15:
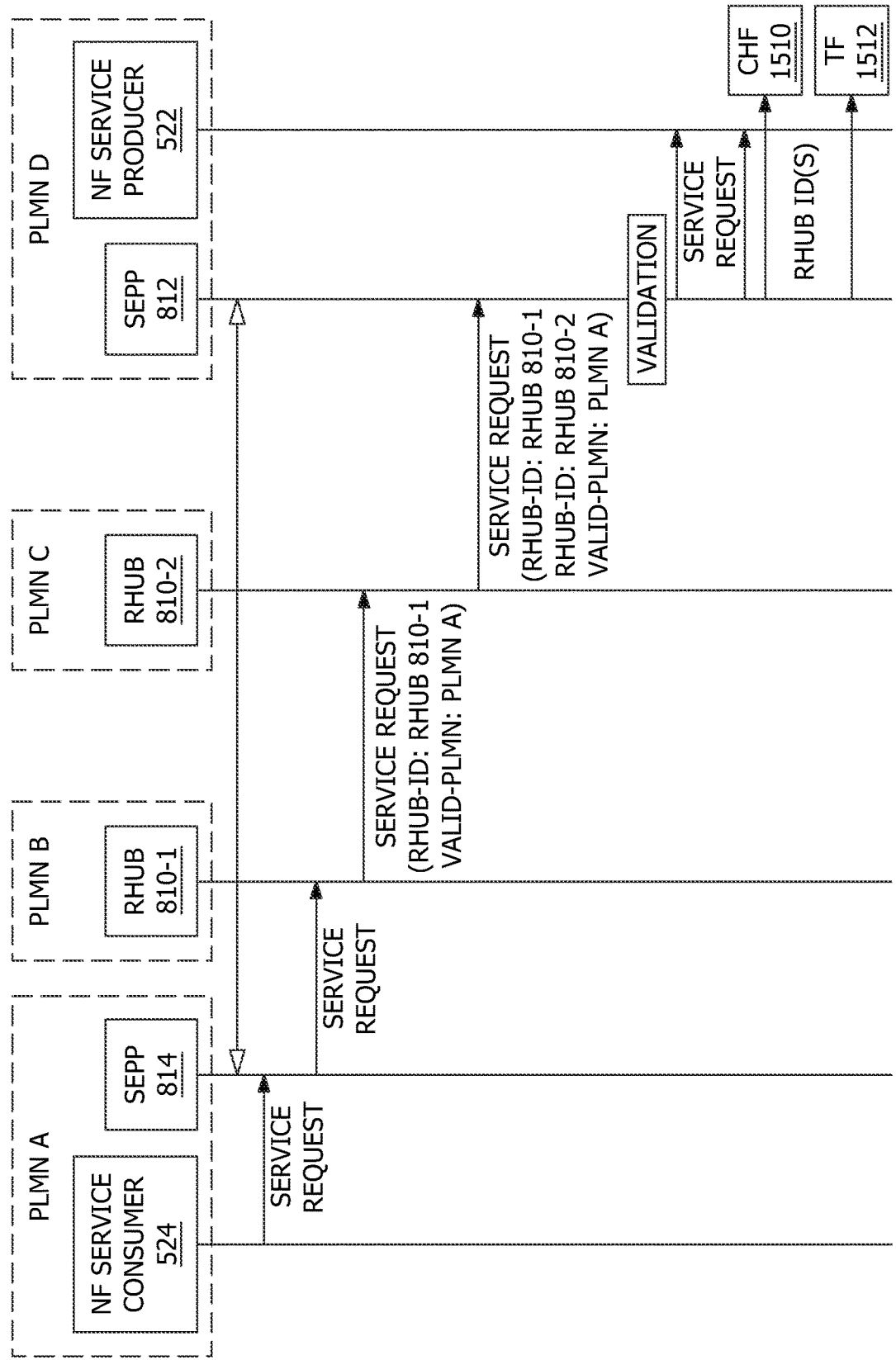
FIG. 15 is a signaling diagram illustrating message forwarding in an illustrative embodiment.

FIG. 15 is a signaling diagram illustrating message forwarding in an illustrative embodiment. In this embodiment, an NF service consumer 524 and a SEPP 814 are shown in PLMN A, and an NF service producer 522 and a SEPP 812 are shown in PLMN D. Multiple roaming hubs 810-1 and 810-2 are implemented in the signaling path 1502 between SEPP 814 and SEPP 812. Roaming hub 810-1 is shown in PLMN B, and roaming hub 810-2 is shown in PLMN C. There is a roaming agreement between PLMN A and PLMN B, a roaming agreement between PLMN B and PLMN C, and a roaming agreement between PLMN C and PLMN D.

Assume for this embodiment that NF service consumer 524 in PLMN A initiates a service request message toward NF service producer 522 in PLMN D. SEPP 814 receives the service request message initiated by NF service consumer 524, and forwards the service request message to roaming hub 810-1 (over the N32 interface 532). Roaming hub 810-1 determines whether the service request message includes a validated PLMN custom header 952. In this example, the service request message does not include a validated PLMN custom header 952, so roaming hub 810-1 adds a validated PLMN custom header 952 to the service request message that indicates the PLMN ID of PLMN A. Due to the roaming agreement between PLMN A and PLMN B, roaming hub 810-1 knows that PLMN A is a trusted entity. Thus, roaming hub 810-1 adds the validated PLMN custom header 952 to the service request message that indicates the PLMN ID of validated PLMN A. Roaming hub 810-1 then integrity protects the validated PLMN custom header 952.

In this example, roaming hub 810-1 also determines whether the service request message includes a Roaming-hub-ID custom header 954. In this example, the service request message does not include a Roaming-hub-ID custom header 954, so roaming hub 810-1 adds or appends a Roaming-hub-ID custom header 954 to the service request message that indicates the roaming hub ID of roaming hub 810-1. Roaming hub 810-1 also integrity protects the Roaming-hub-ID custom header 954. Roaming hub 810-1 may integrity protect the Roaming-hub-ID custom header 954 in the same process as integrity protecting the validated PLMN custom headers 952. Roaming hub 810-1 then forwards the service request message to roaming hub 810-2.

Roaming hub 810-2 receives the service request message, and determines whether the service request message includes a validated PLMN custom header 952. In this example, the service request message includes a validated PLMN custom header 952, so roaming hub 810-2 performs integrity verification on the validated PLMN custom header 952 to verify the content of the validated PLMN custom header 952 (i.e., PLMN ID for PLMN A that is considered a validated PLMN).

In this example, roaming hub 810-2 also determines whether the service request message includes a Roaming-hub-ID custom header 954. In this example, the service request message includes a Roaming-hub-ID custom header 954, so roaming hub 810-2 performs integrity verification on the Roaming-hub-ID custom header 954 to validate the content of the Roaming-hub-ID custom header 954. Roaming hub 810-2 adds another instance of the Roaming-hub-ID custom header 954 to the service request message that indicates its roaming hub ID. Roaming hub 810-2 also integrity protects the validated PLMN custom header 952 and the Roaming-hub-ID custom header 954. Roaming hub 810-2 then forwards the service request message to SEPP 812.

SEPP 812 receives the service request message, and determines whether the service request message includes a validated PLMN custom header 952. When the service request message includes a validated PLMN custom header 952 as in this example, SEPP 812 validates the PLMN of NF service consumer 524 based on a token contained in an HTTP standard header 956 of the service request message and a PLMN ID contained in the validated PLMN custom header 952. As in FIG. 15, the validated PLMN custom header 952 indicates PLMN A. SEPP 812 determines whether the PLMN ID in the Bearer token contained in the Authorization header of the service request message matches the PLMN ID of PLMN A contained in the validated PLMN custom header 952. In this case, the PLMN IDs will match, and SEPP 812 is able to validate the access token in the service request message.

SEPP 812 may also determine whether the service request message includes one or more Roaming-hub-ID custom headers 954. When the service request message includes Roaming-hub-ID custom headers 954 as in this example, SEPP 812 extracts the roaming hub IDs from the Roaming-hub-ID custom headers 954. This data indicates the routing of the service request message over the signaling path 1502. SEPP 812 may forward the roaming hub IDs to NF service producer 522, to a charging function (CHF) 1510 of the 5GC, to a tracing function (TF) 1512 of the 5GC, and/or otherwise use this data. Alternatively, NF service producer 522 may forward the roaming hub IDs to the charging function 1510 and/or the tracing function 1512, and/or otherwise use this data.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit (s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof

What is claimed is:

1. A method of message forwarding, the method comprising:
   receiving, at a roaming hub, a message from a sending entity across an N32 interface; and
   determining, at the roaming hub, whether the message includes a first Hypertext Transfer Protocol (HTTP) custom header that indicates a Public Land Mobile Network (PLMN) that is validated;
   when the message as received does not include the first HTTP custom header, the method further comprises:
      adding the first HTTP custom header to the message that indicates the PLMN of the sending entity;
      integrity protecting the first HTTP custom header; and
      forwarding the message from the roaming hub toward a receiving entity.

2. The method of claim 1 wherein:
   when the message as received includes the first HTTP custom header, the method further comprises:
      performing integrity verification on the first HTTP custom header to validate content of the first HTTP custom header;
      integrity protecting the first HTTP custom header; and
      forwarding the message from the roaming hub toward the receiving entity.

3. The method of claim 2 wherein:
   the first HTTP custom header is defined to indicate a PLMN identifier of a service consumer of the message that is validated.

4. The method of claim 2 further comprising:
   receiving the message from the roaming hub at a Security Edge Protection Proxy (SEPP) across the N32 interface; and
   determining whether the message includes the first HTTP custom header;
   when the message received at the SEPP includes the first HTTP custom header, the method further comprises:
      validating a PLMN of a service consumer based at least on a token contained in an HTTP standard header of the message and a PLMN identifier contained in the first HTTP custom header.

5. The method of claim 1 further comprising:
   determining, at the roaming hub, whether the message includes a second HTTP custom header that indicates one or more roaming hubs that relayed the message;
   when the message as received does not include the second HTTP custom header, the method further comprises:
      adding the second HTTP custom header to the message that indicates a roaming hub identifier of the roaming hub; and
      integrity protecting the second HTTP custom header.

6. The method of claim 5 wherein:
   when the message as received includes the second HTTP custom header, the method further comprises:
      performing integrity verification on the second HTTP custom header to validate content of the second HTTP custom header;
      adding the roaming hub identifier to an instance of the second HTTP custom header; and
      integrity protecting the second HTTP custom header or second HTTP custom headers.

7. The method of claim 6 wherein:
   the second HTTP custom header is defined to indicate a list of roaming hub identifiers; and
   adding the roaming hub identifier to an instance of the second HTTP custom header comprises:
      modifying a present instance of the second HTTP custom header as received in the message to indicate the roaming hub identifier in the list.

8. The method of claim 6 wherein:
   the second HTTP custom header is defined to indicate an identifier of a single roaming hub; and
   adding the roaming hub identifier to an instance of the second HTTP custom header comprises:
      adding another instance of the second HTTP custom header to the message that indicates the roaming hub identifier.

9. The method of claim 6 further comprising:
   receiving the message from the roaming hub at a Security Edge Protection Proxy (SEPP) across the N32 interface; and
   determining whether the message includes one or more instances of the second HTTP custom header;
   when the message received at the SEPP includes the second HTTP custom header, the method further comprises:
      forwarding one or more roaming hub identifiers contained in the second HTTP custom header or the second HTTP custom headers to another entity.

10. The method of claim 9 wherein forwarding one or more roaming hub identifiers contained in the second HTTP custom header or the second HTTP custom headers comprises at least one of:
    forwarding the one or more roaming hub identifiers to a charging function; and forwarding the one or more roaming hub identifiers to a tracing function.

11. The method of claim 6 wherein integrity protecting the first HTTP custom header and integrity protecting the second HTTP custom header comprises:
    signing the first HTTP custom header and the second HTTP custom header with an indication of the roaming hub.

12. The method of claim 6 wherein:
    the second HTTP custom header indicates at least one of:
    a PLMN identifier for the roaming hub;
    a Fully Qualified Domain Name (FQDN) identifier for the roaming hub;
    an Internet Protocol (IP) address for the roaming hub; and
    an instance identifier for the roaming hub.

13. An apparatus comprising:
    at least one processor; and
    at least one memory including computer program code;
    the at least one memory and the computer program code configured to, with the at least one processor, cause the apparatus at least to:
      receive a message from a sending entity across an N32 interface; and
      determine whether the message includes a first Hypertext Transfer Protocol (HTTP) custom header that indicates a Public Land Mobile Network (PLMN) that is validated;
    when the message as received does not include the first HTTP custom header, the computer program code is configured to, with the at least one processor, cause the apparatus to further:
      add the first HTTP custom header to the message that indicates the PLMN of the sending entity;
      integrity protect the first HTTP custom header; and
      forward the message toward a receiving entity.

14. The apparatus of claim 13 wherein:
    when the message as received includes the first HTTP custom header, the computer program code is configured to, with the at least one processor, cause the apparatus at least to:
      perform integrity verification on the first HTTP custom header to validate content of the first HTTP custom header;
      integrity protect the first HTTP custom header; and
      forward the message toward the receiving entity.

15. The apparatus of claim 13 wherein:
    the computer program code is configured to, with the at least one processor, cause the apparatus at least to:
      determine whether the message includes a second HTTP custom header that indicates one or more roaming hubs that relayed the message;
    when the message as received does not include the second HTTP custom header, the computer program code is configured to, with the at least one processor, cause the apparatus at least to:
      add the second HTTP custom header to the message that indicates a roaming hub identifier of the apparatus; and
      integrity protect the second HTTP custom header.

16. The apparatus of claim 15 wherein:
    when the message as received includes the second HTTP custom header, the computer program code is configured to, with the at least one processor, cause the apparatus at least to:
      perform integrity verification on the second HTTP custom header to validate content of the second HTTP custom header;
      add the roaming hub identifier to an instance of the second HTTP custom header; and
      integrity protect the second HTTP custom header or second HTTP custom headers.

17. The apparatus of claim 16 wherein:
    the second HTTP custom header is defined to indicate a list of roaming hub identifiers; and
    to add the roaming hub identifier to an instance of the second HTTP custom header, the computer program code is configured to, with the at least one processor, cause the apparatus at least to:
      modify a present instance of the second HTTP custom header as received in the message to indicate the roaming hub identifier in the list.

18. The apparatus of claim 16 wherein:
    the second HTTP custom header is defined to indicate an identifier of a single roaming hub; and
    to add the roaming hub identifier to an instance of the second HTTP custom header, the computer program code is configured to, with the at least one processor, cause the apparatus at least to:
      add another instance of the second HTTP custom header to the message that indicates the roaming hub identifier.

19. A non-transitory computer readable medium embodying programmed instructions executed by a processor of a roaming hub, wherein the instructions direct the processor to implement a method of message forwarding in the roaming hub, the method comprising:
    receiving a message from a sending entity across an N32 interface; and
    determining whether the message includes a first Hypertext Transfer Protocol (HTTP) custom header that indicates a Public Land Mobile Network (PLMN) that is validated;
    when the message as received does not include the first HTTP custom header, the method further comprises:
      adding the first HTTP custom header to the message that indicates the PLMN of the sending entity;
      integrity protecting the first HTTP custom header; and
      forwarding the message from the roaming hub toward a receiving entity.

20. The computer readable medium of claim 19 wherein the method further comprises:
    when the message as received includes the first HTTP custom header, the method further comprises:
      performing integrity verification on the first HTTP custom header to validate content of the first HTTP custom header;
      integrity protecting the first HTTP custom header; and
      forwarding the message from the roaming hub toward the receiving entity.

* * * * *